United States Patent [19]
Liu

[11] Patent Number: 5,967,734
[45] Date of Patent: *Oct. 19, 1999

[54] FOUR-WHEEL HAND TRUCK WITH ELEVATOR

[76] Inventor: Jimmy Liu, 13803 Boros St., Orlando, Fla. 32837

[ * ] Notice: This patent is subject to a terminal disclaimer.

[21] Appl. No.: 09/198,161

[22] Filed: Nov. 23, 1998

[51] Int. Cl.⁶ .................................................. B65G 7/00
[52] U.S. Cl. ...................... 414/490; 280/5.3; 280/47.24; 187/233
[58] Field of Search .............................. 414/490; 280/5.2, 280/5.28, 5.3, 5.32

[56] References Cited

U.S. PATENT DOCUMENTS

| | | | |
|---|---|---|---|
| 2,493,824 | 1/1950 | Noros | 187/9 |
| 2,714,462 | 8/1955 | Butler | 214/515 |
| 2,904,201 | 9/1959 | Rhodes | 214/515 |
| 3,052,323 | 9/1962 | Hopfeld | 187/10 |
| 3,055,523 | 9/1962 | Wurn | 280/5.2 X |
| 3,199,692 | 8/1965 | Lebre | 214/95 |
| 3,411,798 | 11/1968 | Capadalis | 280/5.2 |
| 3,554,309 | 1/1971 | Abercrombie | 280/2.26 X |
| 3,873,118 | 3/1975 | Takagi | 280/47.2 |
| 3,896,904 | 7/1975 | Walker | 187/9 |
| 4,049,083 | 9/1977 | Garvey | 187/9 |
| 4,728,245 | 3/1988 | Shelton | 414/490 |
| 4,737,065 | 4/1988 | Ju | 414/490 |
| 5,195,762 | 3/1993 | Pressly | 414/490 X |
| 5,290,051 | 3/1994 | Olson | 280/47.27 |
| 5,419,672 | 5/1995 | Poe | 414/540 |
| 5,707,200 | 1/1998 | Liu | 414/490 |

FOREIGN PATENT DOCUMENTS 664 146 A5  12/1978  Switzerland.

*Primary Examiner*—Christopher P. Ellis
*Assistant Examiner*—Gerald J. O'Connor
*Attorney, Agent, or Firm*—Brian S. Steinberger; Law Offices of Brian S. Steinberger

[57] ABSTRACT

An elevator handtruck having four wheels for allowing loads to be moved like an elevator and raised and lowered out from the raised rear edges of a truck such as a pickup truck, moving van, and the like. Safety straps can attach the handtruck to flanges mounted on the wheel wells within a flat bed of the truck vehicle. A motorized carriage having a set of wheels can be slidably mounted on shafts on the rear of a two wheeled handtruck. The carriage wheels can be folded downward when not in use. During use, the carriage wheels sit on the edge of the truck bed such as the tailgate. A user holding a hand control can press buttons causing the carriage to slide up and down causing the entire handtruck to raise upward to the flat bed or downward to the ground. Power can be supplied by attaching jumper cable clip ends connected to the carriage motor on the handtruck to the terminals on the standard vehicle battery.

14 Claims, 4 Drawing Sheets

FOUR-WHEEL HAND TRUCK WITH ELEVATOR

This invention relates to four wheel handtrucks, and in particular to an apparatus to facilitate the raising and lowering of a loaded four wheel handtruck and its load from one level to another. This invention is related to U.S. application Ser. No. 08/723,990 filed on Sep. 30, 1996, and now issued on Jan. 13, 1998 as U.S. Pat. No. 5,707,200, by the same inventor thereof, which is incorporated by reference.

BACKGROUND AND PRIOR ART

The common two-wheel hand truck is used extensively to handle heavy, rigid, box-like loads, especially on a one man job. The body of such a truck consists of a pair of upright rails which are spaced apart by cross bars which are tipped to hold a load at their front faces. A lip stands out from the bottom edge of the front faces of the rails to reach underneath a load to pick it up and to place it upon the rails when the truck is tipped. Two spaced apart wheels are mounted upon a shaft at the back side of the rails and at the bottom of the truck so that when the truck is tilted, it will be upon these wheels. Finally, a handle is provided at the top and at the back side of each rail to enable an operator to hold the truck. In picking up a load, the operator pushes the truck against the side of the box-like load and pushes the lip underneath it. He then tips the truck and the load rearwardly to place the load upon the truck. So positioned, an operator can balance the load over the wheels and move the loaded truck to its destination. Such hand trucks are useful for moving loads across smooth level surfaces but do not help the operator to lift or lower a load from the bed of a pickup truck. Because of this problem, a job such as moving a stove or refrigerator necessitates the use of two or more people to lift or lower the load onto a typical flat bed truck. This need also arises for package handlers such as U.P.S. drivers who have to handle extra heavy boxes from time to time and cannot single-handedly manage to lift or lower a box-like package from the ground to the truck bed. An attempt to solve this problem is shown in U.S. Pat. No. 3,896,904 by Bruce Walker. However, there is a serious problem with Walker's design. Walker describes a two wheeled hand truck in which a pair of legs is cranked down, in a telescoping fashion, from hollow openings formed by tubular vertical members at either side of the back of the hand truck. The proposed mechanism does indeed raise a load from ground level to the height of a truck bed. However, once the load is lifted the user must attempt to lift and lower the hand truck and its contents onto the truck bed. Lowering the legs while the Walker hand truck is fully loaded could also prove problematical. The legs must be extended while the user holds onto the handles of the hand truck, creating a rather precarious situation. Needless to say, this product never made it to the marketplace.

Other patent attempts have been made but still fail to solve the above problems. See for example, U.S. Pat. Nos. 2,493,824 to Noros; 2,714,462 to Butler, 2,904,201 to Rhodes; 3,052,323 to Hopfeld; 3,199,692 to Lebre; 3,873,118 to Takagi; 4,049,083 to Garvey; 4,728,245 to Shelton; 4,737,065 to Ju; 5,195,762 to Pressly; 5,290,051 to Olson and 5,419,672 to Poe.

OBJECTS OF THE INVENTION

A primary object of the present invention is to provide a four-wheeled hand truck with an elevator that can be easily and safely operated by one person so that an individual can transport a heavy object such as a refrigerator, stove, washing machine or dryer from one location, onto a truck bed (such as that of a pickup truck), and then down off the truck and to a second location.

A secondary object of the present invention to provide a four-wheeled hand truck with an elevator that is more easily used in climbing stairs than a conventional hand truck.

A third object of the present invention is to provide a four-wheeled hand truck of which the elevator portion is motorized using 12-volt D.C. power coming from a truck's electrical power supply.

A fourth object of the present invention is to provide a four-wheeled hand truck, with an elevator, on which a load such as a washing machine can be strapped and remain strapped in an essentially upright position during all phases of transportation.

The invention can be used for raising and lowering loads from the rear of a pickup truck. The invention adds two shafts to an industrial handtruck. The shafts are inboard and parallel to the outer upright structure of the standard hand cart. A carriage assembly rides on the upright shafts and a shaft with a pair of wheels is attached to the carriage assembly. A winch motor located near the bottom of the hand truck, and a spool of cable which has spring biased cable can be attached to an upper portion of the rear of the handtruck. Electricity for the motor can be supplied by cable type jumper cables connected to the terminal of the vehicles battery. When electricity is applied to the motor, the cable lifts or lowers the carriage and attached wheels. To lift a loaded hand truck, the user ties or hooks safety straps from the hand truck to flanges with eyeholes mounted in the side wheel wells within the flat bed portion of the truck, and the operator places the carriage wheels on top of the tailgate or another outer floor portion of the pickup truck bed. Power is then applied to the motor assembly causing the traditional wheels and floor of the hand truck to rise until the load is essentially level with the bed of the truck. The operator can then pull the loaded hand truck fully onto the truck bed and tie both the load and the hand truck in place for safe transport To lower the load, the user ties or hooks safety straps from the hand truck to flanges with eyeholes mounted in the side wheel wells within the flat bed portion of the truck. Then the operator rolls the hand truck to the edge of the truck bed so that the traditional hand truck wheels are off the truck bed while the carriage wheels are still on the truck bed. With the hand truck and load safely tied, the operator then applies power to the winch causing the hand truck to lower down until the hand truck wheels touch the ground. At this point, the operator can remove the safety straps and roll the hand truck and its load to its destination. The operator can untie or unhook the safety straps without fear of the load tipping over because, with all four wheels on the ground, the hand truck and load can remain in a slightly tilted yet stable position. When negotiating stairs, an operator can use the extra set of carriage wheels to "walk" the hand truck and load up or down the stairs. In this way, a single person can easily and safely transport a heavy object such as a washing machine or refrigerator from one location, onto a truck bed, up stairs if necessary, then to its final destination. The user can operate the truck with a handheld control having a first depressible button which raises the dual wheel carriage and a second depressible button which lowers the dual wheel carriage. The rearwardly extending dual wheels on the carriage can fold down when the invention is not being used.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
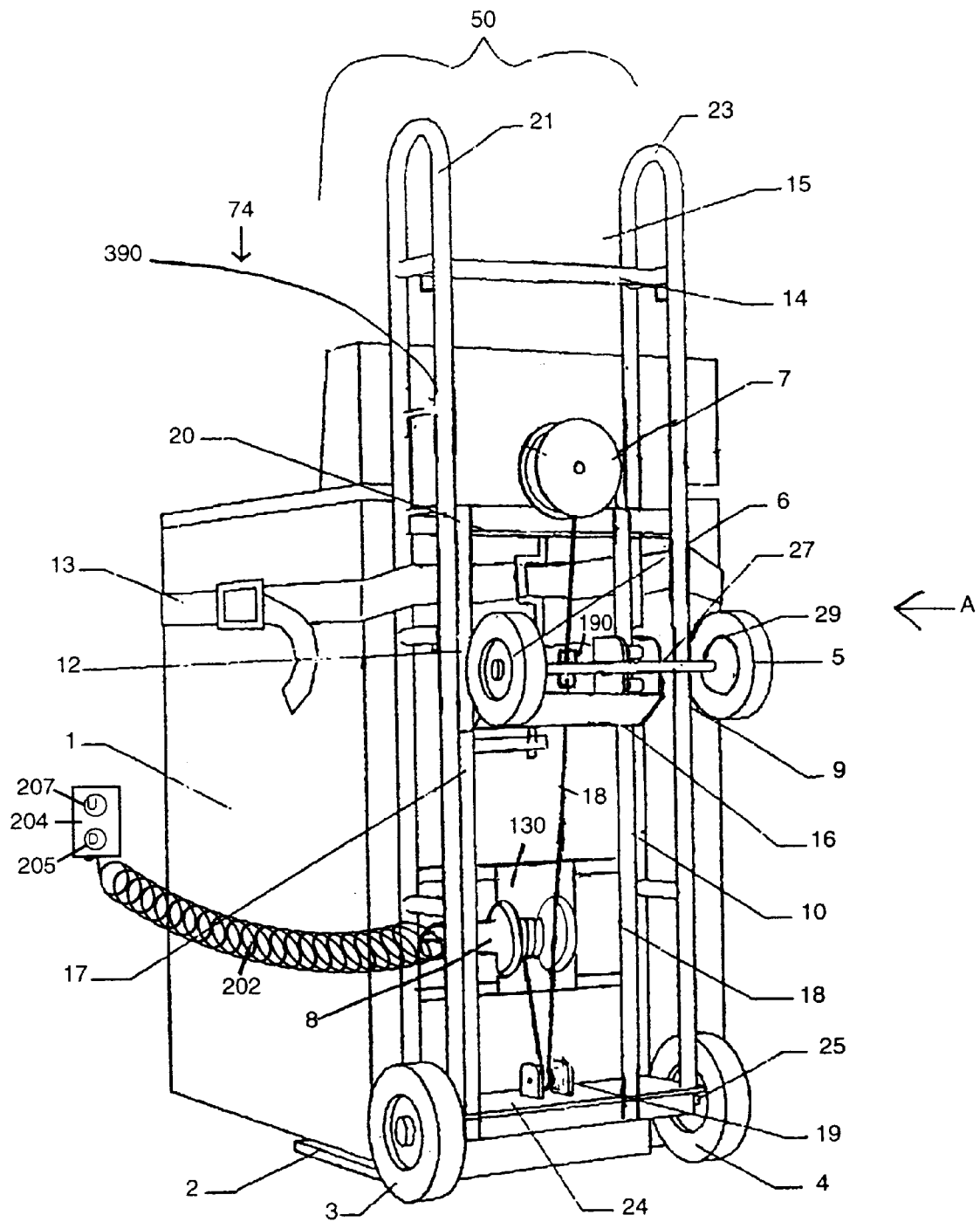
FIG. 1 is a perspective view of the four-wheel hand truck with elevator of the present invention.
Figure 2:
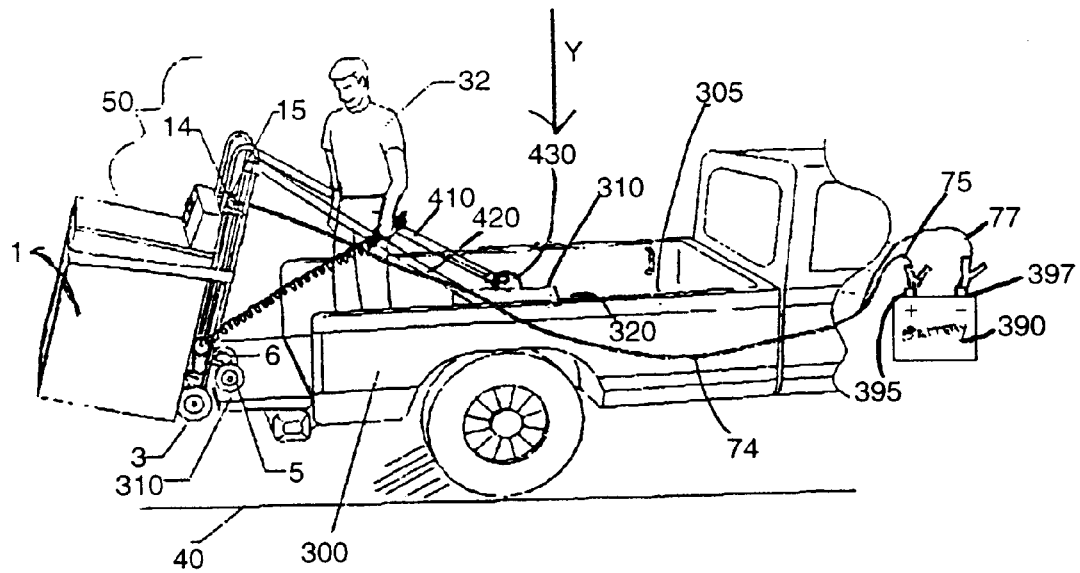
FIG. 2 is a perspective view of the present invention on top of the tail gate of a pickup truck.

Referring to FIG. 1, a load, in this case a washing machine 1, is strapped in place by a strap 13 to the hand truck 50 of the present invention. The hand truck 50 is based on a conventional hand truck design in that it has a base plate 2, two upright members 21, 23, terminating in handle portions, two wheels 3,4, attached by shaft 25 which is in turn attached to horizontal cross member 24. The invention encompasses novel features discussed below which make the hand truck of the present invention unique, and facilitate the moving of objects heretofore stated. A pair of wheels 6 and 5 are attached by an axle shaft 27 to horizontal bars 28, 128, which are hingedly connected at points 101, 103 to traveling horizontal plates 29 and 129. A rear plate 190 connects between horizontal plates 29, 129. Plates 29 and 129 have interior facing rollers 80 (shown more clearly in reference to FIG. 5) which allow plates 29, 129 to travel up and down on vertical shafts 17 and 18. Shafts 17 and 18 start at lower horizontal plate 24 and terminate in upper horizontal plate 20. A common winch consisting of reel 7 is mounted to the rear face of the upper horizontal plate 20, a bottom pulley 19 is mounted on top of lower horizontal plate 24, and motor 8 is attached to a lower side plate 130 between shafts 17, 18. A cable 18 unwinds from reel 7 through pulley 19 to an electric motor 8. Cable 18 is fixedly mounted to a rear plate 190. As the cable 18 moves rear plate 190, this causes wheels 5, 6 to lower or raise depending upon whether the invention 50 is raised up or down. A coiled control wire 202 connects motor 8 to a hand control 204 having buttons which allow the wheels 5, 6 to raise and lower. Referring to FIGS. 1 and 2, a long power cable 74 can be used to connect electrical power from motor 8 to jumper cable clip ends 75, 77 which can clip about terminals 395, 397 on the vehicle battery 390.

Figure 6:
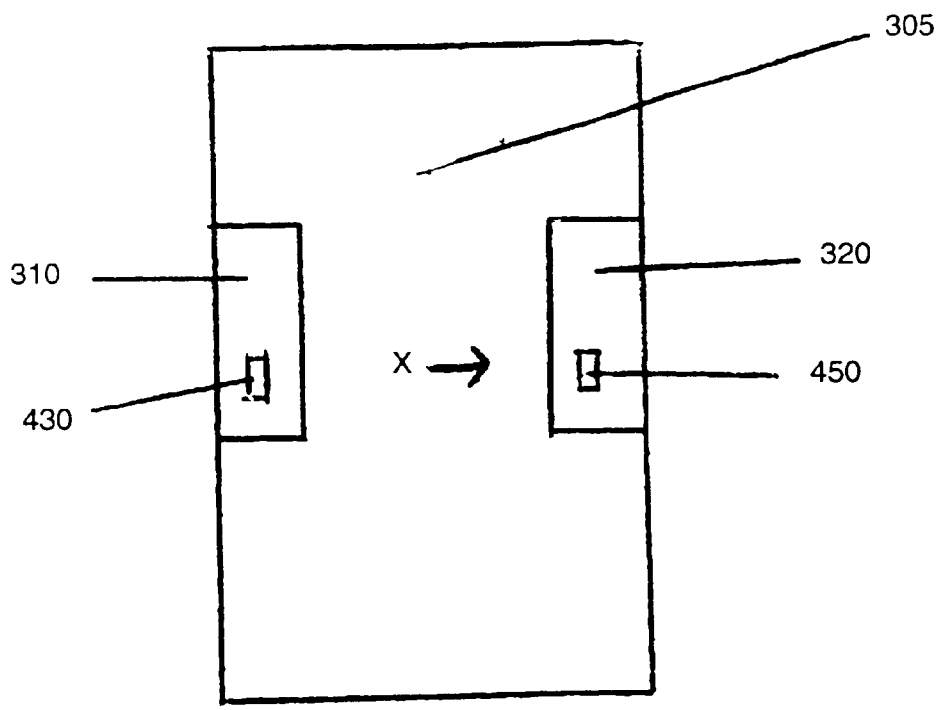
FIG. 6 is a top view of the flat bed and wheel well portion of the pickup truck 300 of FIG. 2 along arrow Y.
Figure 7:
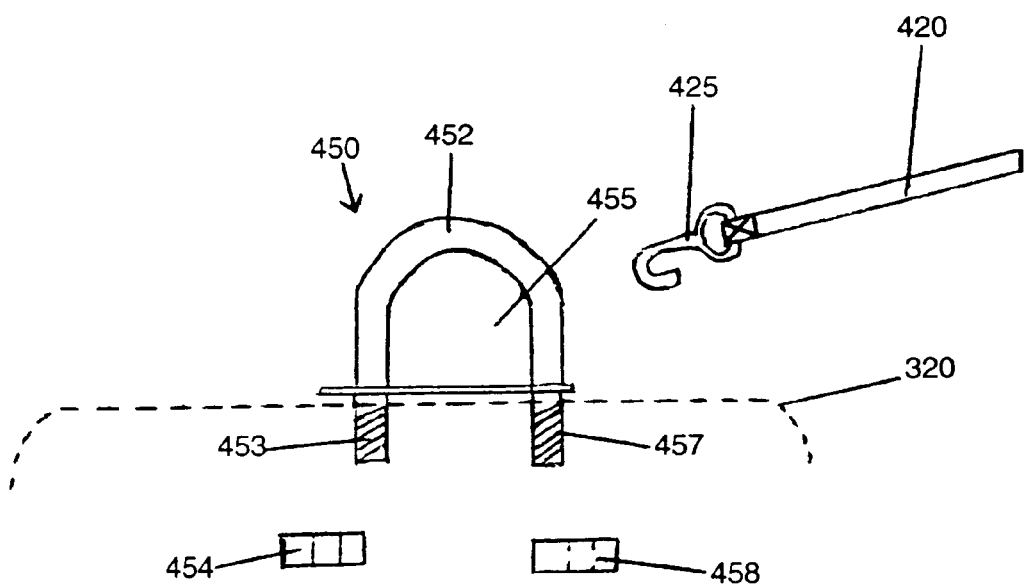
FIG. 7 is an enlarged side view of a flange hook connector of FIG. 6 along arrow X.

FIG. 2 shows a person 32 standing on the flat bed of a pickup truck 300. FIG. 6 is a top view of the flat bed 305 and wheel wells 310, 320 of the pickup truck 300 of FIG. 2 along arrow Y showing dual flange hook connectors 430, 450 mounted thereon. FIG. 7 is an enlarged side view of a flange hook connector 450 of FIG. 6 along arrow X. Referring to FIGS. 2, 6 and 7, flange hook connectors 430, 450 are identically mounted to the top of conventional raised wheel wells 310, 320. For example, right flange hook connector 450 has a main base portion 452 having a cylindrical through eye-hole 455 on end, with threaded bolts 453, 457 extending downwardly therefrom. Nuts 454, 458 having threaded through hole interiors screwably attach through the bottom of wheel well 320 to fasten the flange hook connector 450 to the wheel well 320. Strap 420 has end attached to upper handtruck portion 21 and the second hook end 425 attached to eye hole 455.

Figure 3:
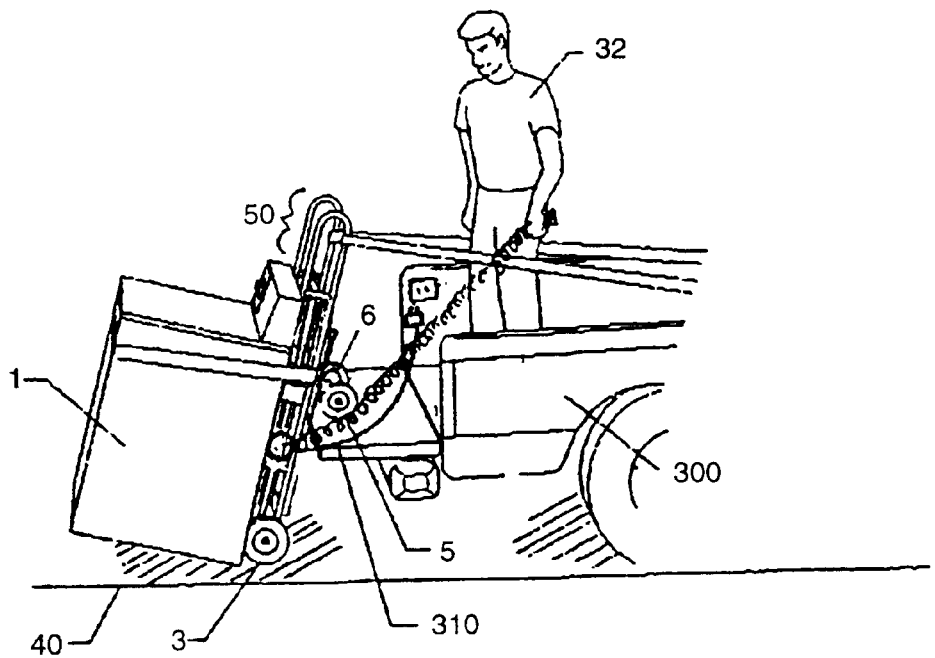
FIG. 3 is a perspective view of the present invention after the elevator has been lowered to ground level from the tail gate of a pickup truck.

FIG. 3 is a perspective view of the present invention after the elevator 50 has been lowered to ground level from the tail gate 310 of a pickup truck 300. Referring to FIGS. 1–3, 6 and 7, the person 32 has fastened safety straps 410, 420 from the handle portion 21, 23 of the hand truck of the present invention to flange hooks 430, 450. Referring to FIG. 2, a standard hand truck wheel 3 is just off the edge of the tail gate 310, and the slidable elevator wheels 5, 6 are resting on the outer edge of tail gate 310. The person attaches jumper cable clip ends 75, 77 to vehicle battery terminals 395, 397. When a down button 205 on handheld control 204 is pressed, the power winch motor 8 causes the slidable side plates 29, 129 to rise on shafts 18 and 17 thereby causing the main part of the hand truck assembly 50 to lower until wheels 3 and 4 touch the ground (FIG. 3), at which point the user 32 turns off the winch and disconnects the safety straps 410, 420 and the power cord jumper cable clip ends 75, 77. The user is now ready to transport the load 1 to its final destination.

Figure 4:
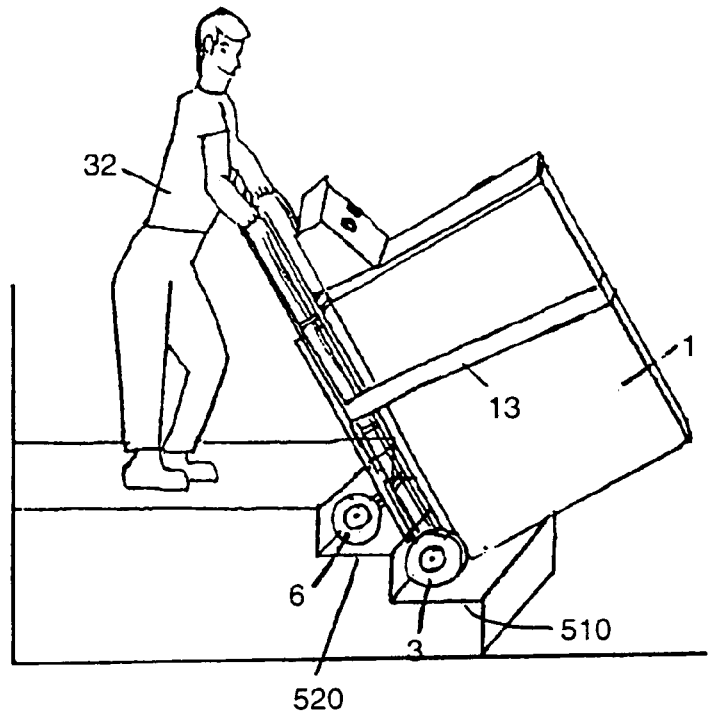
FIG. 4 is a perspective view of a person using the present invention to transport a load up and down stairs.

If getting to the destination involves climbing stairs as shown in FIG. 4, the user 32 can rock the hand truck from one set of wheels 3, 4 (not shown) to the other set 6, 5 (not shown), from one step 510 to another 520, making it easier to transport the load 1 up stairs 510, 520.

Figure 5:
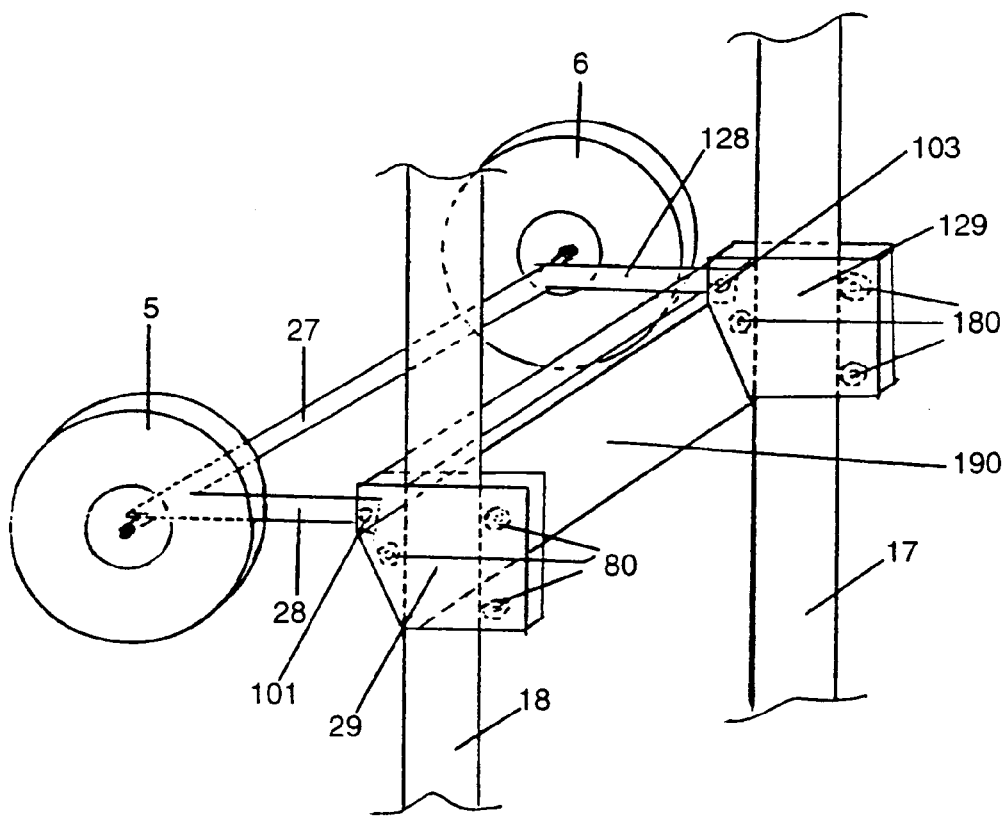
FIG. 5 is an enlarged detailed side view of the slidable wheel assembly of FIG. 1 along arrow A.

FIG. 5 shows an enlarged detail of the sliding assembly 12. Dotted lines indicate rollers 80 which act as bearings and carry the weight of whatever load is being transported. When not being used axle 27 with wheels 5, 6 can rotate downward in the direction of arrow R allowing hinge points 101, 103 of horizontal bars 28, 128 to pivot relative to and within side plates 29, 129 allowing the invention to more easily be transported.

Although the power cable 74 is shown outside the pickup truck 300, the power cable 74 can alternatively be mounted under the truck flat bed 305. Alternatively, the user can mount an external power receptacle to a location within the flat bed area so that power cable 74 can be used with a male prong end for being able to plug into the receptacle as is used on campers, and the like. Still furthermore, a battery power pack can be used on the device 50 so that the invention does not require a separate power source and is thus more portable for use in areas remote from power supplies.

Although the preferred embodiment describes using the invention with a pickup truck, the invention can also be used to raise and lower loads from covered trucks such as moving vans, and any raised vehicle surface. Also the invention can be used without an extending tailgate.

Although safety straps are described above, other connection lines can be used such as ropes, cables, chains, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A four wheel hand truck with a hand controlled operated elevator for lifting and lowering a load in and out of a vehicle comprising:

a single base plate having a front edge and a rear edge, the base plate for supporting a load;

a vertical frame having an upper end, a lower end, a front surface and a rear surface, the upper end having hand grips and the lower end of the front surface fixably attached to the rear edge of the single baseplate;

a first pair of wheels fixably attached to the lower end of the vertical frame for supporting both the single base plate and the frame above a ground surface;

a pair of parallel spaced shafts fixably attached to the rear surface of the vertical frame;

a second pair of wheels each slidably mounted to each of the shafts; and motorized means for sliding the second pair of wheels up and down the shafts in unison, wherein the second pair of wheels when supported on a raised edge of a vehicle forms an elevator to raise to the vehicle and to lower the load from the vehicle.

2. The four wheel handtruck of claim 1, further comprising:

a hand control having a switch for raising and lowering the elevator;

a pair of slidable mounts for sliding up and down the shafts;

extended members having first ends hingedly connected to the mounts and second ends attached to each of the second pair of wheels, wherein the extended members allows the wheels to move from a position extending rearwardly and horizontally from the shafts to a second position substantially parallel and adjacent to the shafts for allowing the handtruck to be more easily stored.

3. The four wheel handtruck of claim 1, further comprising:

a power cord for electrically connecting the motorized means to a battery in the vehicle.

4. The four wheel handtruck of claim 3, further comprising:

jumper cable clip ends for connecting the power cord to terminals on the battery.

5. The four wheel handtruck of claim 1, wherein the raised edge of the vehicle includes:

a tail gate on the vehicle.

6. The four wheel handtruck of claim 1, further comprising:

safety lines for attaching the handtruck to the vehicle.

7. The four wheel handtruck of claim 6, further comprising:

flanges mounted on wheel wells within a flat bed portion of the vehicle.

8. The four wheel handtruck of claim 7, wherein the flanges each includes:

an upper portion having a through hole for attachment to ends of the safety lines; and threaded bolt extending downward from the flanges for being inserted through the wheel wells to fasteners thereunder.

9. A wheeled handtruck having an extra set of foldable wheels which solely raises and lowers the entire wheeled handtruck comprising in combination:

a handtruck including:

a single baseplate for supporting a load;

a vertical frame having an upper end with hand grips and a lower end fixably attached to the single baseplate;

a first pair of freely rotatable wheels having axial supports that are fixably attached to the lower end of the vertical frame for supporting both the single base plate and the vertical frame above a ground surface;

a shaft means fixably attached to a rear surface of the vertical frame;

a second pair of freely rotatable wheels having axial support means, the axial support means being slidable about the shaft means;

folding means for allowing the second pair of wheels to move from a first position extending rearwardly from the shaft means to a folded position substantially adjacent to the shaft means; and means for sliding the axial support means of the second pair of wheels up and down the shafts in unison so that the handtruck itself moves relative to the second pair of freely rotatable wheels and their axial support means, and wherein supporting the second pair of wheels on a raised edge of the vehicle allows the load to be raised and lowered to the vehicle.

10. The four wheel handtruck of claim 9, further comprising:

a hand control having a switch for raising and lowering the elevator;

a power cord for electrically connecting the motorized means to a battery in the vehicle.

11. The four wheel handtruck of claim 10, further comprising:

jumper cable clip ends for connecting the power cord to terminals on the battery.

12. The four wheel handtruck of claim 9, further comprising:

safety lines for attaching the handtruck to the vehicle.

13. The four wheel handtruck of claim 12, further comprising:

flanges mounted on wheel wells within a flat bed portion of the vehicle.

14. The four wheel handtruck of claim 13, wherein the flanges each includes:

an upper portion having a through hole for attachment to ends of the safety lines; and threaded bolt extending downward from the flanges for connecting to the wheel wells.

* * * * *